United States Patent
Gonzalez Alemany et al.

(10) Patent No.: US 7,946,411 B2
(45) Date of Patent: May 24, 2011

(54) AUXILIARY DRAG MECHANISM AT VARIABLE SPEED

(75) Inventors: Miguel Angel Gonzalez Alemany, Oviedo (ES); Abdón Muniz Camblor, Oviedo (ES); Iván Ruiz Patallo, Gijon (ES); Mónica Diaz Sorribas, Gijon (ES)

(73) Assignees: Thyssenkrupp Elevator Innovation Center, S.A., Gijon, Asturias (ES); Thyssenkrupp Elevator (ES/PBB) GmbH, Essen (DE)

( * ) Notice: Subject to any disclaimer, the term of this patent is extended or adjusted under 35 U.S.C. 154(b) by 0 days.

(21) Appl. No.: 12/402,277

(22) Filed: Mar. 11, 2009

(65) Prior Publication Data

US 2010/0089718 A1    Apr. 15, 2010

(30) Foreign Application Priority Data

Oct. 10, 2008   (ES) .................................. 200802877

(51) Int. Cl.
  *B66B 23/26*   (2006.01)
(52) U.S. Cl. ...................................... 198/334; 198/673

(58) Field of Classification Search .................. 198/334, 198/335, 672, 673
See application file for complete search history.

(56) References Cited

U.S. PATENT DOCUMENTS

| | | | | |
|---|---|---|---|---|
| 3,842,961 A | * | 10/1974 | Burson | 198/334 |
| 3,903,806 A | * | 9/1975 | Ayres et al. | 198/334 |
| 4,509,429 A | * | 4/1985 | de Broqueville | 198/334 |
| 6,138,816 A | * | 10/2000 | Sato et al. | 198/334 |
| 6,170,632 B1 | * | 1/2001 | Shimura et al. | 198/334 |
| 7,063,203 B2 | | 6/2006 | Gonzalez Alemany et al. | |

FOREIGN PATENT DOCUMENTS

ES    2 272 118    4/2007

* cited by examiner

*Primary Examiner* — James R Bidwell
(74) *Attorney, Agent, or Firm* — Merchant & Gould P.C.

(57) ABSTRACT

Auxiliary drag mechanism at variable speed, consisting of a variable pitch worm being geared with connection means of the components to be moved, at least during part of their path of travel, at variable speed. The worm is mounted between two end supports (8) and at least one intermediate support (9), whose supports leave free the gearing area between the connection means and the worm, along said worm.

7 Claims, 7 Drawing Sheets

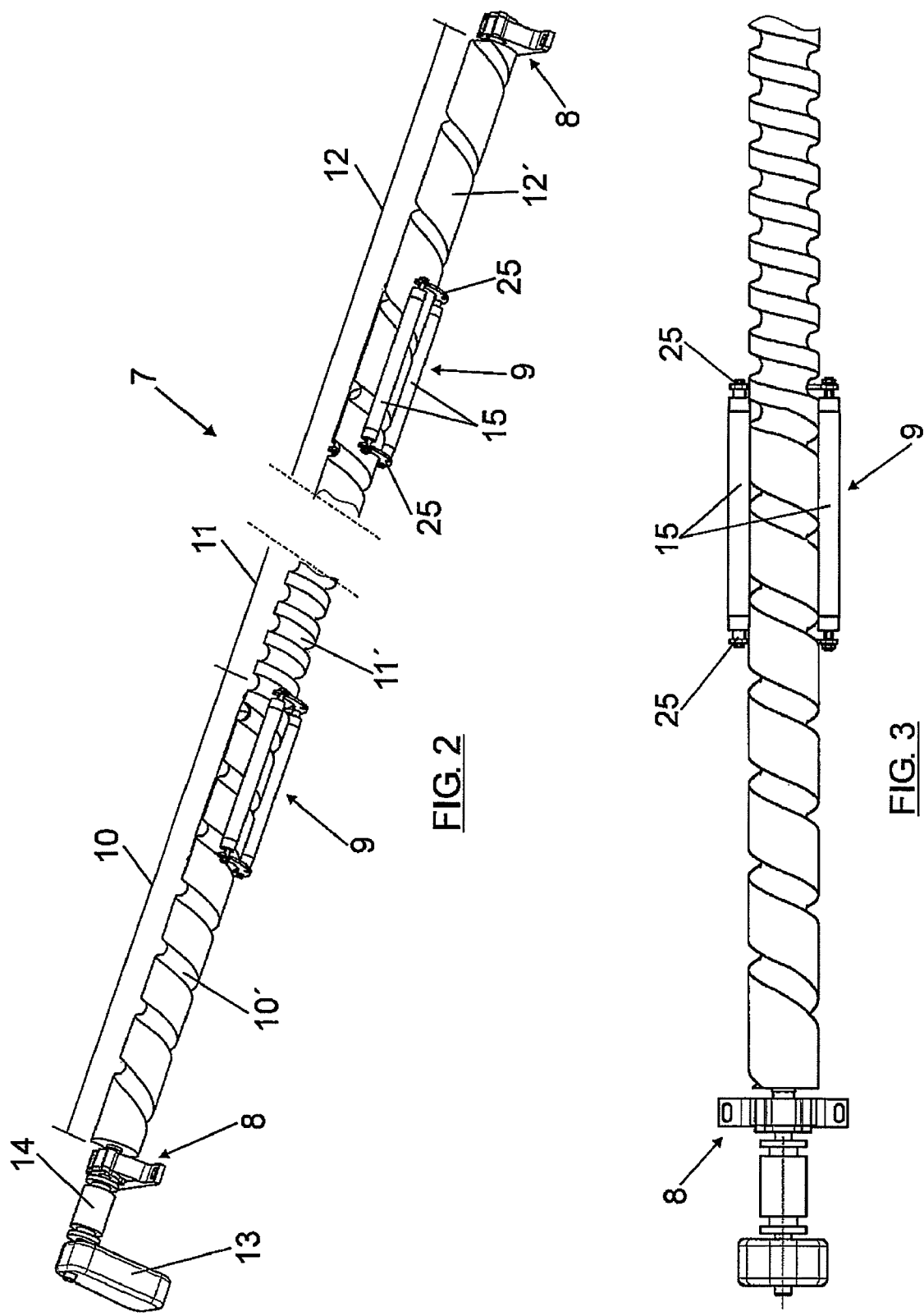

AUXILIARY DRAG MECHANISM AT VARIABLE SPEED

This application is a claims benefit of Serial No. 200802877, filed 10 Oct. 2008 in Spain and which application are incorporated herein by reference. To the extent appropriate, a claim of priority is made to the above disclosed applications.

FIELD OF THE INVENTION

The present invention refers to an auxiliary drag mechanism applicable to equipments or facilities where certain components or elements have to be moved, at least during part of its path of travel, at variable speed.

The mechanism of the invention is especially applicable to transportation facilities, both for people and goods, for example in moving walkways and escalators, where both the walkway plates and the handrail move at variable speed, between a minimum speed at the entry and exit and a maximum speed along the central line, there existing intermediate sections where the plates move at a variable speed between the minimum and maximum speeds mentioned.

The mechanism of the invention comprises a variable pitch worm with which it is possible to gear, along certain sections of the moving walkway or escalator, connection devices of the pallets or handrail.

BACKGROUND OF THE INVENTION

ES 200400773 of the same applicants describes a variable speed handrail for transportation systems for people, especially moving walkways and escalators. This handrail comprises a flexible profile, which moves along the moving walkway or escalator, with a forward moving section and a return section, a mechanism for dragging said profile and multiple handgrips coupled onto the flexible profile.

The flexible profile moves at a constant speed all along, while the handgrips are independent from said profile and move at mostly the same speed as the closest walkway plates. As these walkway plates move along the belt or escalator at a constant speed along certain sections and at a variable speed along others, the handgrips will move at a constant speed along the same sections as the walkway plates do and at a variable speed along the same sections as said plates do.

For the handgrips to move at a constant or variable speed, said handgrips have first and second connection means to the flexible profile or to a drag mechanism and to an auxiliary drag mechanism at variable speed. The first connection means connect the handgrip to the flexible profile or drag mechanism thereof when said handgrip moves along the section where the walkway plates move at a constant speed, while the second connection means connect the handgrip to the auxiliary drag mechanism at a variable speed, when said handgrip moves along the section where the walkway plates move at a variable speed.

The second connection means consist of a variable pitch worm which moves along the section along which the walkway plates move at a variable speed and of an arm projecting from one of the sides of the handgrips and gears with said worm running along the aforementioned section.

The variable pitch worm is connected at one of its ends with an operating mechanism, through a rigid transmission system which also acts as a support for the worm. This means that the worm does not rest on any kind of support, but rather that it is the operating mechanism, through a rigid transmission system, which acts as a support for the worm, which, from said system, moves in cantilever.

This system has operation problems mainly due to the fact that the operating system undergoes undesired efforts, both for supporting the worm and because of the gearing between the connection means and said worm, which causes early damages to the operating system.

DESCRIPTION OF THE INVENTION

The object of the present invention is to eliminate the aforementioned problems using an auxiliary drag mechanism at variable speed for equipment components, consisting in a variable pitch worm mounted in such a way as to avoid transmitting to the operating system any other action than the one derived from the rotation drive itself between said operating system and worm.

According to the invention, the worm is mounted between two end supports and at least one intermediate support, being the end support adjacent to the operating system independent form said system. Both the end supports and the intermediate supports are constituted in such a way so as not to interfere or interrupt the path of the worm with which the connection means of the components to be moved have to be geared. To that end, the supports shall leave free the gearing area between the connection means and the worm, along the entire worm.

Preferably, the end supports will be located outside the gearing section between the aforementioned connection means and the worm. For example, the worm can have only one part and extend itself in crankpins or cylindrical sections, through which they rest on the supports, constituted by bearings, bushings, etc.

The worm can also be constituted by one, two or more tubular parts, featuring on their outer surface the sections of the throat with the corresponding passage. These tubular parts are mounted and fixed on a male projecting from both ends in parts which shall be used for mounting the worm on the end supports.

The intermediate supports can comprise groups of free-rotating rollers parallel to the worm, which are tangent to the surface of said worm, under the gearing area between the aforementioned connection means and said worm. Each group of rollers can comprise at least two rollers and be mounted between end supports with adjusting means to guarantee the tangency of all the rollers with the worm.

The intermediate supports can also consist of supports with a curve-concave surface, coaxial and tangent with the surface of the worm, having an internal surface or bed on which the worm rests, under the gearing area between the aforementioned connection means and said worm, being the contact surface of the support formed by a material with a low friction coefficient.

According to another embodiment variant the intermediate supports can consist of a vertical plate which penetrates through a peripheral channel of the worm, for example, coinciding with the dividing plane of two consecutive parts of the worm, and supports a bearing mounted on the nucleus of said worm. This channel, like the plate, shall have a reduced thickness, so that even though the throat interrupts the helical thread of the worm, this will not affect the gearing between the aforementioned connection means and the worm.

Logically, the contact area between the throat and the bearing will be located under the gearing area between the connection means and the worm.

In order to operate the worm, it will be connected by one of its ends to an operating mechanism through a rigid coupling to the rotation drive between both elements, but it will allow certain degree of misalignment between the axes thereof.

BRIEF DESCRIPTION OF THE DRAWINGS

The invention will be better understood with the help of the following description, which refers to a series of drawings, attached to this document, which show an embodiment of said invention which is presented as a non-limiting example thereof, being said drawings as follows:

FIG. 2 shows a perspective view of an auxiliary drag mechanism constituted according to the invention.

FIG. 3 shows an upper plant view of the mechanism of FIG. 2.

DETAILED DESCRIPTION OF AN EMBODIMENT

The constitution and characteristics of the auxiliary mechanism of the invention shall be explained with reference to a specific application of said mechanism, as a dragging device at variable speed for a moving walkway or escalator handrail, without this implying a limitation for the application of said mechanism, since it can also be used as a dragging means at variable speed of walkway plates of moving walkways or escalators, and even as dragging means of other components of equipment or facilities to be moved, along certain parts of its path, at variable speed.

Figure 1:
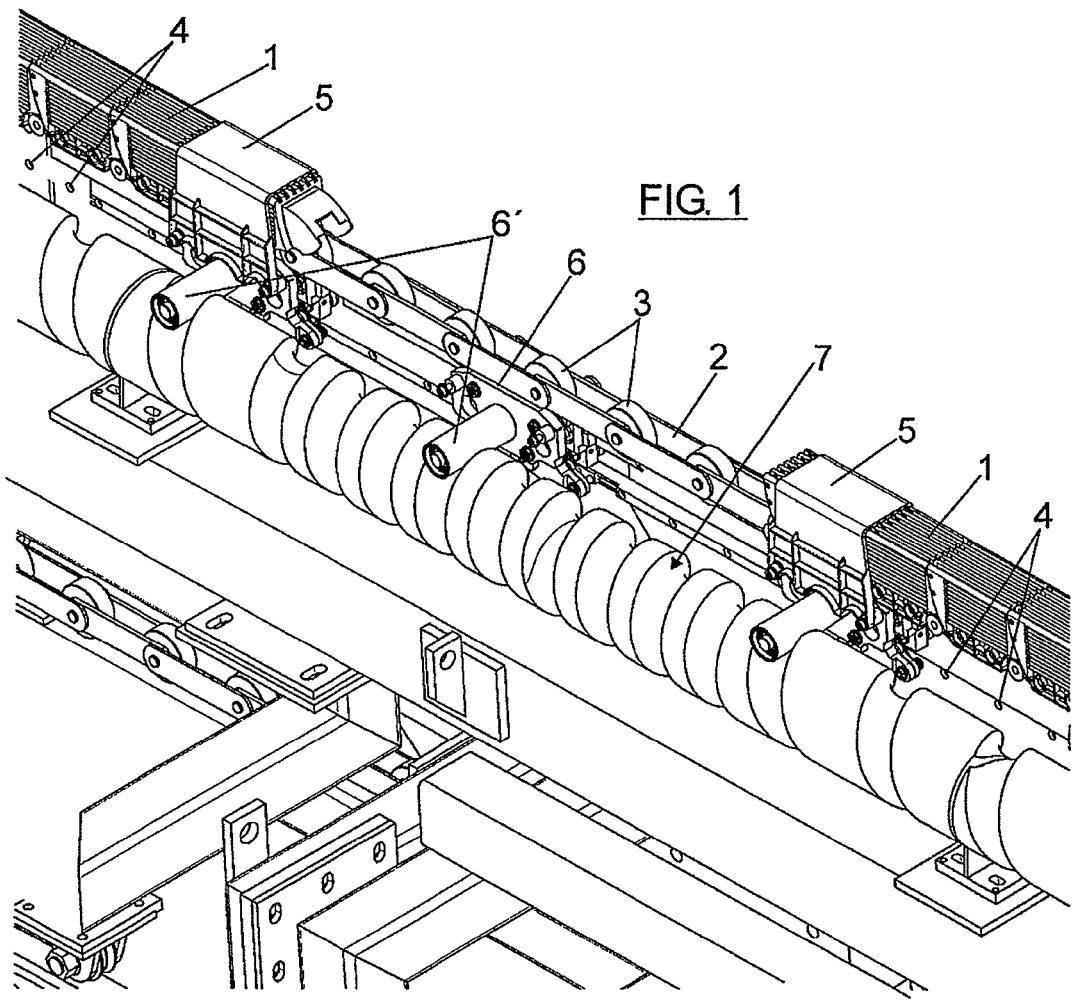
FIG. 1 shows a partial perspective view of an example of an application of an auxiliary drag mechanism at variable speed, for moving walkway and escalator handrails, comprising a variable pitch worm.

FIG. 1 shows an auxiliary drag mechanism at variable speed for a moving walkway or escalator handrail, as described in ES 200400773.

The handrail shown in FIG. 1 has a flexible profile comprising multiple fixed parts 1 with a grooved structure, which are coupled on a chain 2 which includes free-rotating rollers 3. The sections 1 of the handrail are fixed to the chain 2 through screws or pins 4. On certain parts 1 of the flexible profile forming the handrail there are handgrips 5, each one of them mounted on a carriage 6.

The parts 1 of the flexible profile forming the handrail present a longitudinally grooved external surface and the handgrips 5 have a ribbed inner surface, which can be coupled to the grooved profile of the sections 1, having said coupling certain clearance.

The carriages 6 have locking and unlocking means with the chain 2. In the locking position the carriages 6, and therefore the handgrips 5 as well, move at a constant speed, corresponding to the speed of the chain 2. The unlocking position corresponds precisely to the parts where the handgrips 5 have to move at variable speed, to that end there is an auxiliary mechanism constituted by a variable pitch worm, indicated with the reference number 7, which runs along the section where the handrail has to move at variable speed, and by an arm 6' which projects from the carriage 6 and gears in the worm 7 along the aforementioned sections of variable speed where, as it has been noted before, the carriages 6 are unlocked from the dragging chain 2.

The worm 7 is connected to an operating mechanism, which is in charge of producing the rotation thereof and mounted between two end supports 8 and one or more intermediate supports 9, as shown in FIG. 2.

In the example shown in FIGS. 2 and 3, three sections of the worm are represented, indicated by the reference numbers 10, 11 and 12, in which the corresponding throat 10', 11' and 12' moves at a different pace, but it has to be taken into account that the passage of the worm varies progressively between both sections, along the entire worm. This variation in pace will make the arm 6', FIG. 1, move linearly at different speed, along the entire worm.

The end supports 8 will be located outside the gearing section between the arm 6' and the worm 7. To that end, the worm can extend at its end in long crankpins or cylindrical sections which will be coupled to the supports 8, constituted by bearings, bushings, etc. The worm 7 is connected to an operating mechanism 13 through a coupling 14 which will secure the rigidity to the rotation drive between the mechanism and the worm, but it will allow for certain degree of misalignment between its axes.

The intermediate supports 9 are constituted, in the example shown in FIGS. 2 and 3, by groups of rollers 15, for example three rollers in each group, being said rollers free-rotating rollers and parallel to the worm 7 and tangent to the surface thereof. The rollers 15 will be located under the gearing area between the arms 6' of the carriages 6 and the worm 7, forming the aforementioned arms 6' the connection means between the handrail and the worm.

The sets of rollers 9 define intermediate supports for the worm 7 which do not affect the rotation of the worm. Through the set of end supports 8 and intermediate supports 9 it is attained that neither the operating mechanism 13 nor the coupling 14 undergo other efforts than those of the rotation drive.

Figure 4:
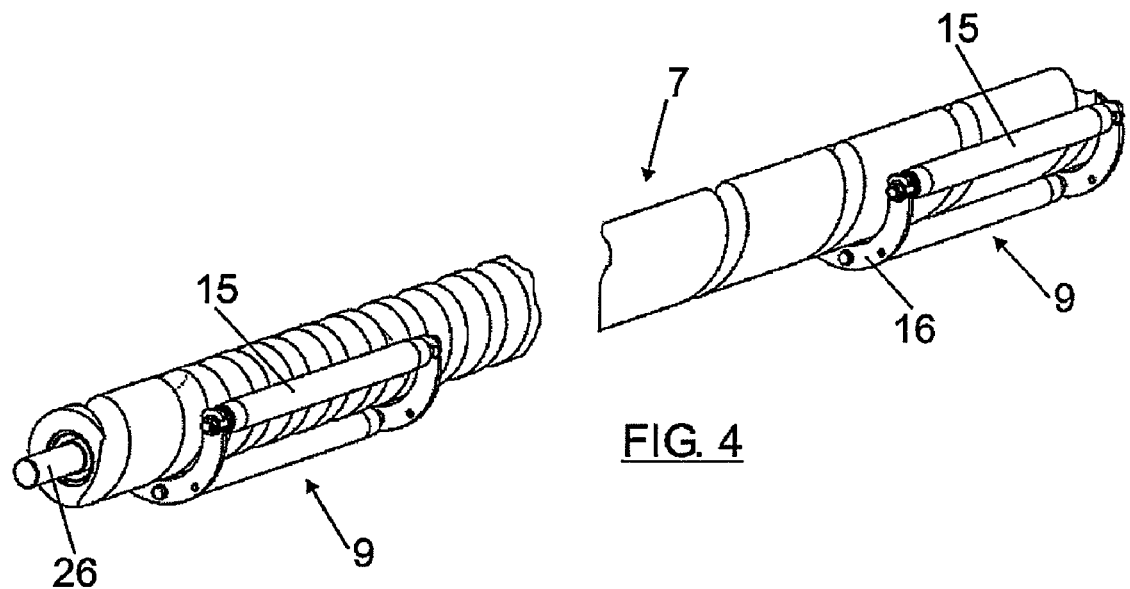
FIG. 4 shows a partial perspective view of the worm of FIG. 2.
Figure 5:
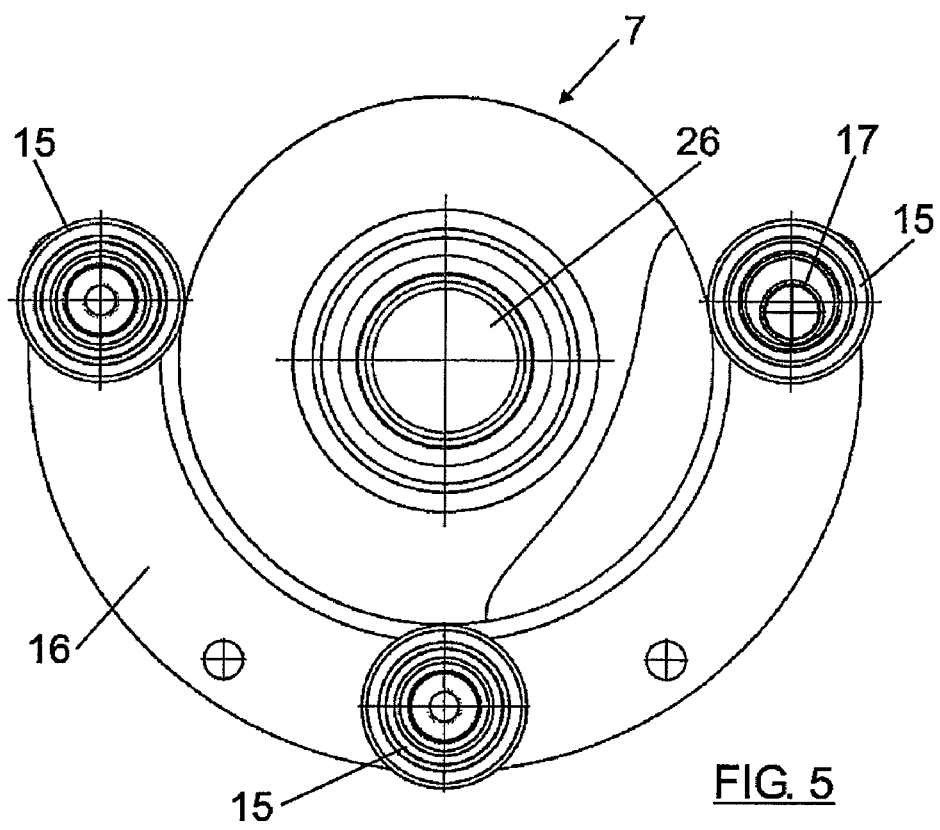
FIG. 5 shows a frontal view of the worm, according to the A direction of FIG. 4.

FIGS. 4 and 5 show more clearly the arrangement of the intermediate supports 9, as well as the tangency between the rollers 15 and the surface of the worm 7, being all the rollers located under the gearing area between the arm 6' and the worm 7, as it can be seen in FIG. 1, in the upper area of the worm.

The rollers 15 can be mounted between arched end supports 16, featuring adjusting means which secure the tangency with the worm 7. These means can consist, as shown in FIG. 5, of an eccentric axis system 17 for one of the upper rollers, which adjusts it to the worm and enables said worm to be mounted from above. It can also have a sliding system, instead of an eccentric axis system, in another mechanism which enables to perform the instructions given.

Figure 6:
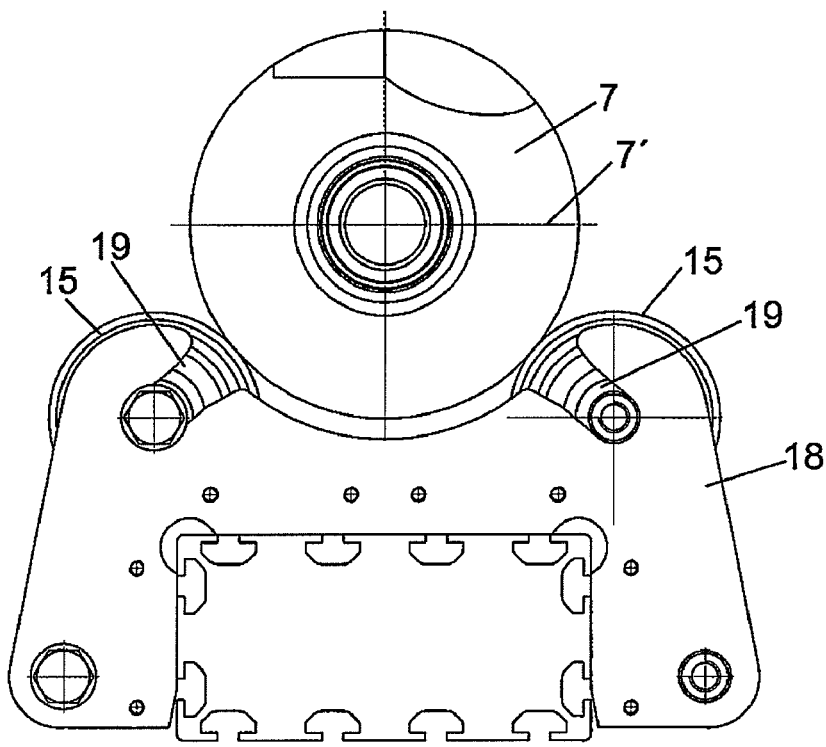
FIGS. 6 and 7 are similar views to the one in FIG. 5 showing other embodiment variants.
Figure 7:
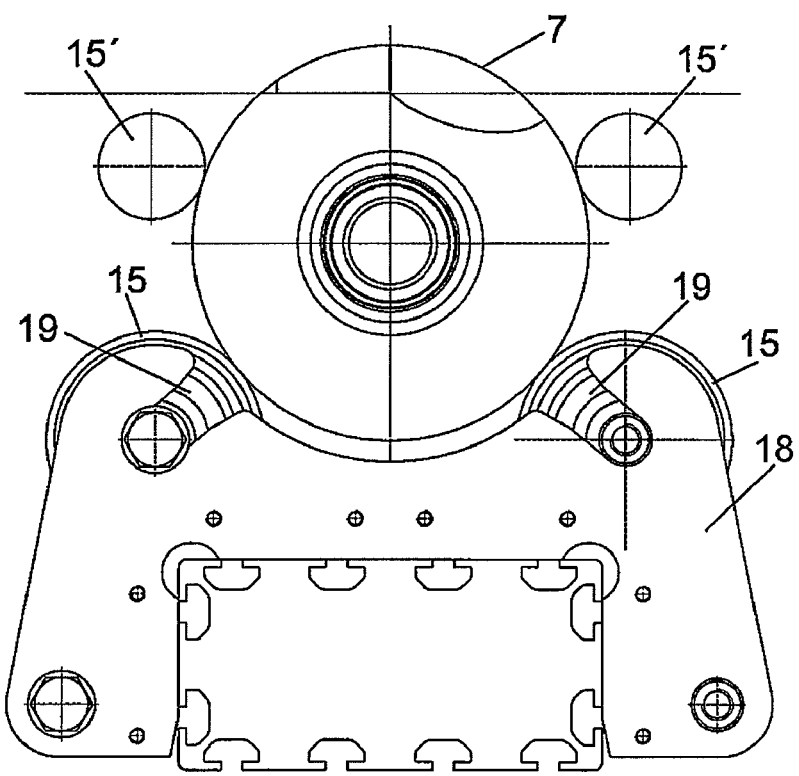

FIGS. 6 and 7 show intermediate support variants, comprising rollers 15, in which the number of rollers varies, there being two in FIG. 6, tangent to the worm 7 in points located under the points coinciding with the ends of the horizontal diameter 7' of the worm 7 section. The rollers 15 are mounted on a support 18 using slides 19 which enable to adjust them on the worm 7. The arms 6' act as a holding element to prevent the worm 7 from lifting.

In FIG. 7 the support includes four rollers, the two top ones 15' being removable, while the two bottom ones 15 can be mounted in the same way as indicated with reference to FIG. 6.

Figure 8:
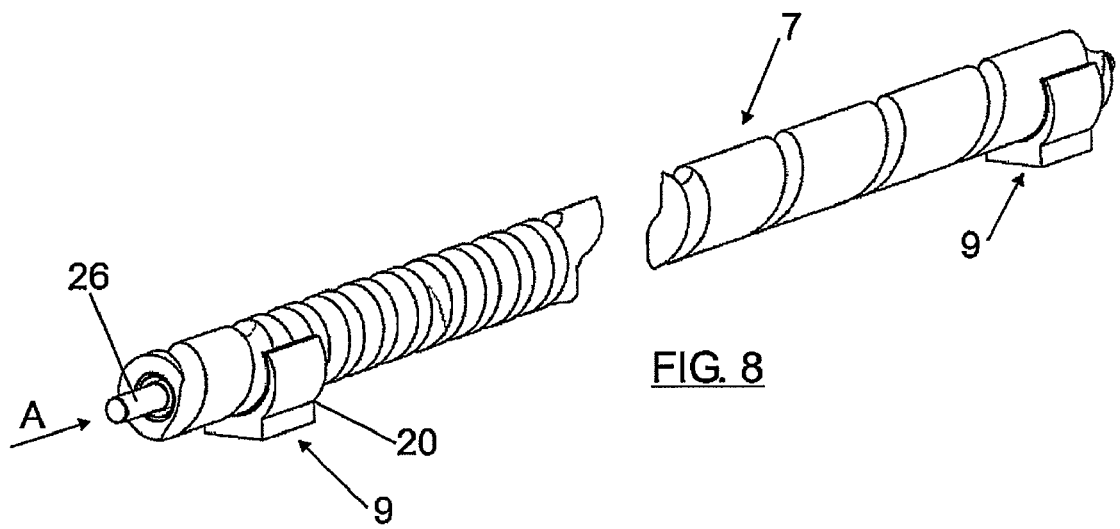
FIGS. 8 and 9 are similar views to the one in FIGS. 4 and 5, showing a first embodiment variant of the supports of the worm.
Figure 9:
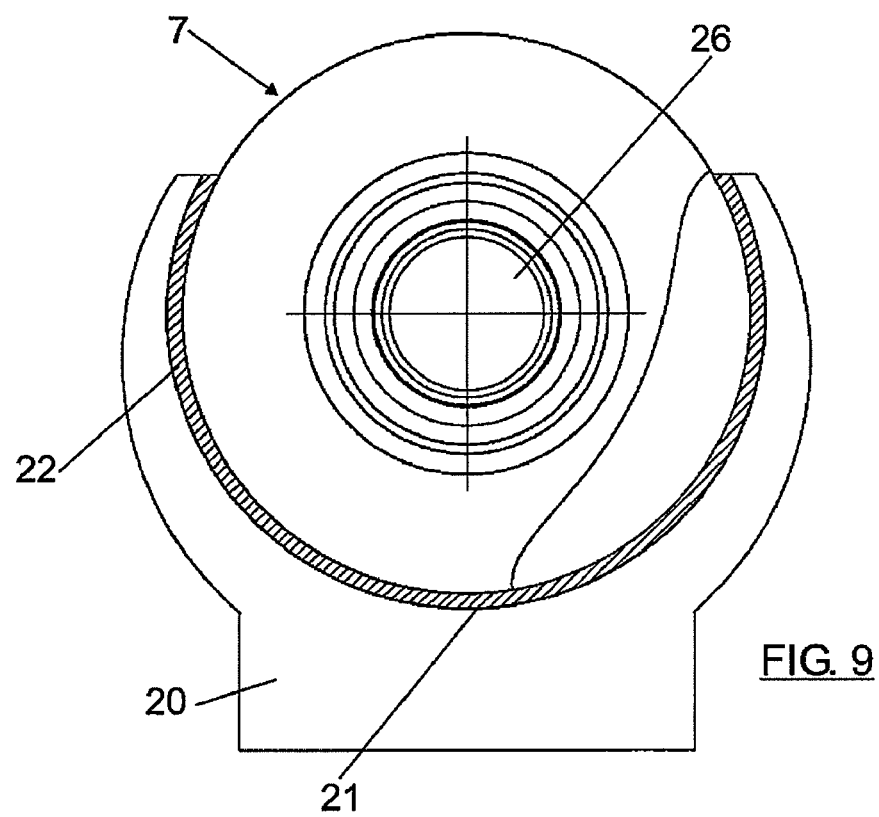

FIGS. 8 and 9 show an embodiment variant of the intermediate supports 9, comprised by supports 20 which, as it can be seen better in FIG. 9, have a concave-curve inner surface 21, coaxial with the axis of the worm 7, which can be covered by a layer 22 made of a material with a reduced friction coefficient, defining this coating a curved surface tangent to the outer surface of the worm 7 and located under the gearing area between the connection means defined by the arms 6', FIG. 1, and the worm 7.

The worm 7 can have only one part and extend at its ends in crankpins 31, FIG. 4, for mounting it on the end supports, FIGS. 2 and 3.

Figure 10:
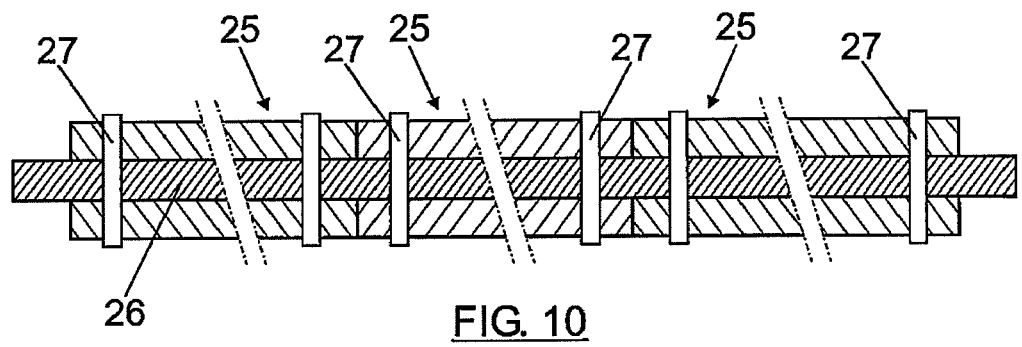
FIG. 10 shows a diametric section of the worm which forms part of the mechanism of the invention.

As shown in FIG. 10, the worm 7 can be comprised by two or more tubular parts 25 mounted on the nucleus 26, to which they can be fixed using pins 27. Each tubular part 25 will have a throat on its outer surface with the corresponding passage. The nucleus 26 will protrude on both sides, with respect to the tubular parts 25, in parts which will form the crankpins 31 for mounting the worm on the end supports 8.

Figure 11:
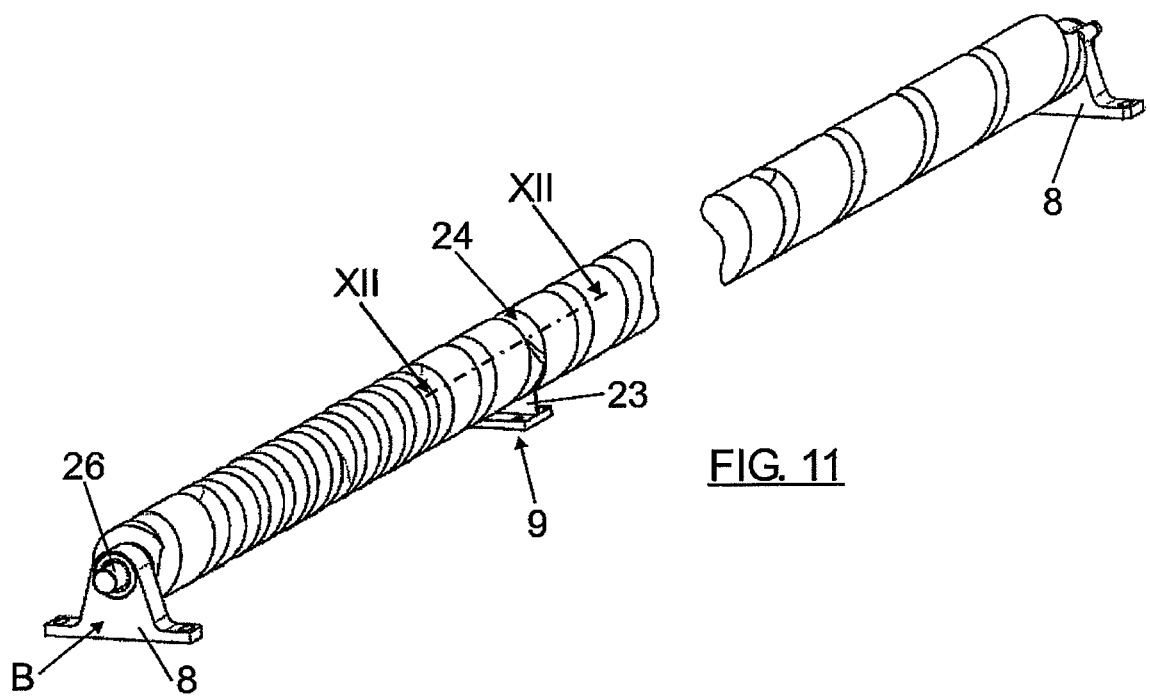
FIG. 11 shows a similar view to the one in FIG. 4 corresponding to another embodiment variation of the intermediate supports of the worm.
Figure 12:
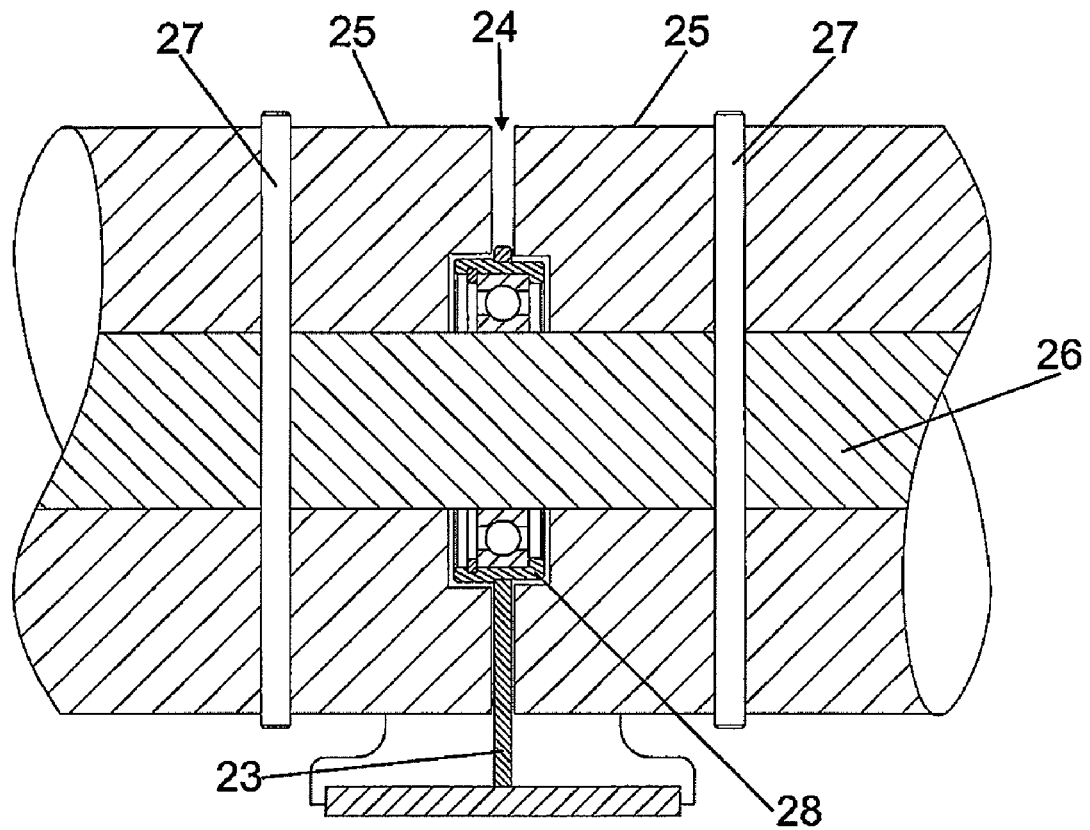
FIG. 12 shows a longitudinal section of the worm, taken according to the cutting line XII-XIII of FIG. 11.

Finally, FIG. 11 shows a third embodiment variation, in which each intermediate support 9 consist of a vertical plate 23 which is coupled to a peripheral channel 24 of the worm. This channel can consist, FIG. 12, of the division between two consecutive parts 25. The plate 23 supports a bearing 28 mounted on the nucleus 26 of the worm. The support area of the bearing 28 and the plate 23 is located under the gearing area between the connection means defined by the arms 6' and the worm 7.

Even though in this case the throat of the worm 7 can be partially interrupted by the channel 24, this having a reduced thickness, it does not affect the gearing between the arm 6', FIG. 1, and the worm 7.

Figure 13:
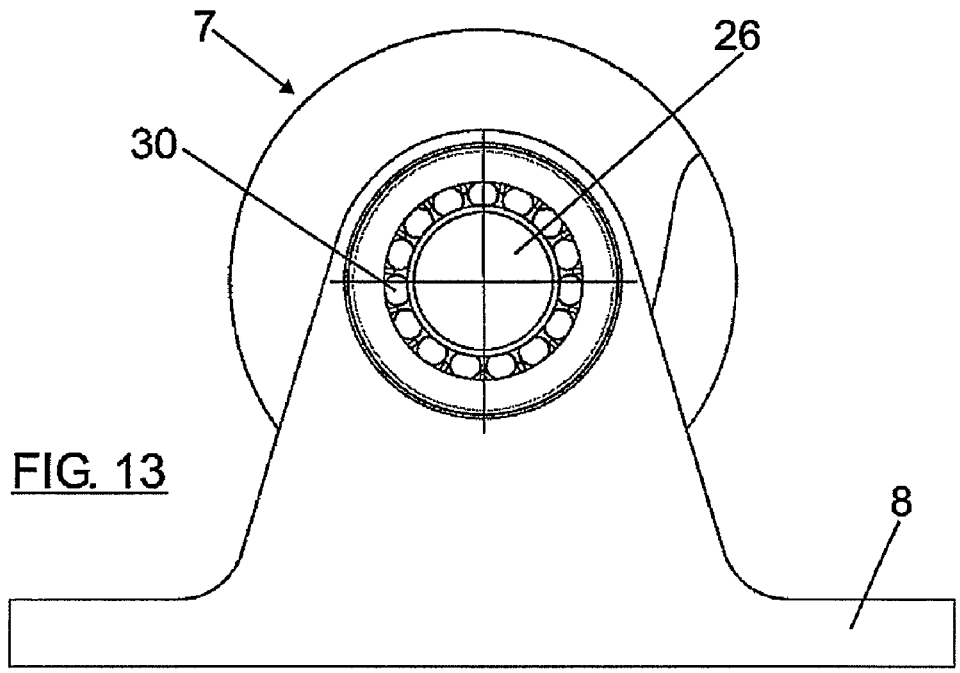
FIG. 13 shows a view of the worm according to the B direction of FIG. 11.

FIG. 13 shows one of the end supports 8, constituted by a bearing 30 which supports the end of the nucleus 26 of the worm 7.

With the aforementioned constitution, it is possible to attain that the worm 7, regardless of its length, be supported through the end supports 8 and the intermediate supports 9, without the operating mechanism 13 or the coupling mechanism 14 undergoing efforts due to the weight of the worm or the operation of the gearing of the arm 6' with said worm.

As indicated before, the mechanism of the invention can be applied to equipments and facilities in which certain elements or components have to be moved, at least for certain paths, at variable speed.

The invention claimed is:

1. Auxiliary drag mechanism at variable speed, applicable to equipment or facilities where certain components or elements have to be moved, at least during part of its path of travel, at variable speed, comprising: a variable pitch worm which is geared with connection means of the aforementioned components, when said components move along the path of travel along which they have to move at variable speed, wherein the worm is mounted between two end supports and at least one intermediate support, whose supports leave free a gearing area between the aforementioned connection means and the worm along the entire worm, and wherein the worm includes one or more consecutive tubular sections and a coaxial nucleus, wherein the one or more tubular sections have, on an end surface, sections of a worm throat consecutively fixed to the nucleus, thereby keeping continuity between corresponding throat sections; and wherein the nucleus projects, with respect to the one or more tubular sections, in sections defining a crankpin, for mounting on the two end supports.

2. A mechanism according to claim 1, wherein the worm has only one part and extends at both ends in coaxial crankpins, for its mounting on the end supports.

3. A mechanism according to claim 1, wherein the intermediate supports consist of groups of free-rotating rollers, parallel to the worm, which are tangent to the surface of said worm, under the gearing area between the connection means and the worm, whose rollers are mounted between the end supports which have means to adjust the support of said rollers on the worm.

4. A mechanism according to claim 1, wherein the intermediate supports consist of supports with a curve-concave surface, coaxial and tangent with the surface of the worm under the gearing area between the connection means and said worm.

5. A mechanism according to claim 4, wherein the curve-concave surface of the supports is covered by a layer of material with a low friction coefficient.

6. A mechanism according to claim 1, wherein the intermediate supports consist of vertical plates which are coupled in a peripheral channel constituted by the division between two consecutive sections and reaching to the nucleus, on which the bearings are mounted, being the contact area between the bearing and the plate located under the gearing area between the connection means and said worm.

7. A mechanism according to claim 1, wherein the tubular sections forming the worm are fixed to the nucleus through pins.

* * * * *